United States Patent [19]
Dean

[11] Patent Number: 5,896,732
[45] Date of Patent: Apr. 27, 1999

[54] SIDE SICKLE FOR A GARDEN TRACTOR

[76] Inventor: Curtis R. Dean, P.O. Box 555, Jonesville, Va. 24263

[21] Appl. No.: 08/885,527

[22] Filed: Jun. 30, 1997

[51] Int. Cl.$^6$ .................................................. A01D 34/07

[52] U.S. Cl. .............................. 56/13.7; 56/15.6; 56/267; 56/296

[58] Field of Search .............................. 56/15.6, 16.4 R, 56/13.7, 13.6, 16.9, 265, 267, 276, 283, 316, 296, 306

[56] References Cited

U.S. PATENT DOCUMENTS

| | | | |
|---|---|---|---|
| 2,457,693 | 12/1948 | Leicy | 56/296 |
| 2,647,354 | 8/1953 | Horste | 56/267 |
| 3,180,073 | 4/1965 | Tuft | 56/296 |
| 4,250,699 | 2/1981 | Hallberg | 56/235 |

*Primary Examiner*—Terry Lee Melius

[57] ABSTRACT

A side sickle for a lawn tractor including a sickle having a first end pivotally coupled with respect to the lawn tractor. The sickle adapted to transfer between a stored orientation and a horizontal orientation wherein the sickle is extended perpendicular with respect to a side of the tractor. The sickle has a plurality of reciprocating blades.

5 Claims, 3 Drawing Sheets

SIDE SICKLE FOR A GARDEN TRACTOR

BACKGROUND OF THE INVENTION

1. Field of the Invention

The present invention relates to a side sickle for a garden tractor and more particularly pertains to cutting weeds with a lawn tractor or the like that is equipped with a side sickle.

2. Description of the Prior Art

The use of sickle mechanisms is known in the prior art. More specifically, sickle mechanisms heretofore devised and utilized for the purpose of cutting foliage are known to consist basically of familiar, expected and obvious structural configurations, notwithstanding the myriad of designs encompassed by the crowded prior art which have been developed for the fulfillment of countless objectives and requirements.

By way of example, the prior art includes U.S. Pat. No. 4,942,725 to Ruder, Sr.; U.S. Pat. No. 3,958,400 to Sorensen et al.; U.S. Pat. No. 4,768,334 to Honey et al.; U.S. Pat. No. 4,250,699 to Hallberg; U.S. Pat. No. 4,912,916 to Parsons, Jr.; and U.S. Pat. No. 4,629,006 to Mullet et al.

In this respect, the side sickle for a garden tractor according to the present invention substantially departs from the conventional concepts and designs of the prior art, and in so doing provides an apparatus primarily developed for the purpose of cutting weeds with a lawn tractor.

Therefore, it can be appreciated that there exists a continuing need for a new and improved side sickle for a garden tractor which can be used for cutting weeds with a lawn tractor or the like that is equipped with a side sickle. In this regard, the present invention substantially fulfills this need.

SUMMARY OF THE INVENTION

In view of the foregoing disadvantages inherent in the known types of sickle mechanisms now present in the prior art, the present invention provides an improved side sickle for a garden tractor. As such, the general purpose of the present invention, which will be described subsequently in greater detail, is to provide a new and improved side sickle for a garden tractor which has all the advantages of the prior art and none of the disadvantages.

To attain this, the present invention essentially comprises a mounting assembly having an L-shaped configuration with a top vertical extent and bottom horizontal extent each with a U-shaped configuration. The top vertical extent has a top cross bar and a pair of side vertical bars coupled to ends of the top cross bar and extended downwardly therefrom. Note FIG. 1. The bottom horizontal extent includes a rear cross bar and a pair of side horizontal bars. Such side horizontal bars of the bottom horizontal extent are coupled between ends of the rear cross bar and bottom ends of the pair of side vertical bars of the top extent. As best shown in FIG. 1, the mounting assembly further includes a U-shaped side bar coupled to one of the side horizontal bars of the bottom horizontal extent of the mounting assembly. The top extent of the mounting assembly is coupled to a rear lifting mechanism of a convention lawn tractor. In use, the lifting mechanism is adapted to allow the selective lifting of the mounting assembly. With reference still to FIG. 1, an engine is coupled atop the bottom extent of the mounting assembly. The engine has an elongated, rigid throttle handle with a first end pivotally coupled to a top side portion of the engine. By this structure, the handle is allowed rotation about a horizontal axis. A second end of the handle is equipped with a depressible lever for activating the motor upon the selective depression thereof. In use, the handle has a first lowered orientation with the lever situated adjacent a seat of the tractor and second raised orientation with the lever positioned distant from the seat in an elevated position. As best shown in FIGS. 1 & 3, an elongated mechanized sickle is provided having a first end pivotally coupled to the U-shaped side bar of the mounting assembly. The sickle is adapted to only pivot between a horizontal orientation wherein the sickle is extended perpendicular with respect to a side of the tractor and a vertical orientation. The first end of the sickle further has a flexible sled coupled to a lower end thereof. The sickle also includes a generally rectangular, arcuate swath board coupled thereto and extended rearwardly therefrom. As a whole, the sickle is comprised of a sleeve with a plurality of blade guards coupled to a front extent thereof. It is also comprised of a blade rod. The blade rod is slidably coupled with respect to the sleeve and has a plurality of blades situated between the blade guards. To allow use, the blade rod has an inboard end with a tab coupled thereto. By such design, upon the reciprocating movement of the tab, the blades are adapted to cut foliage. Associated therewith is a sickle locking mechanism including a rod. Such rod has a first end coupled to the motor and a second end releasable coupled to a central extent of the sickle. As such, the sickle locking mechanism is adapted for selectively maintaining the sickle in the vertical orientation. Further provided is a throttle locking mechanism including a hook coupled to a central extent of the throttle handle. The hook is designed to be releasably coupled to an eyelet formed in the second end of the sickle. For allowing the motor to effect motion of the blade rod of the sickle, a drive assembly is provided. As shown in FIG. 4, included is a drive wheel eccentrically coupled to the engine and adapted to rotate upon the activation of the engine. A drive rod is also included having a first end in rotatable communication with the drive wheel and a second end pivotally coupled to a double pin piston. It should be noted that the drive rod and the piston are slidably situated within a crank case. A connection rod has a first end pivotally coupled to the piston and a second end pivotally coupled to the tab of the blade rod of the sickle. Coupled to an end of the crank case and situated about the connection rod is a boot. Upon the actuation of the engine, reciprocating motion is imparted to the connection rod which, in turn, effects reciprocating movement of the blade rod of the sickle for cutting foliage.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved side sickle for a garden tractor which has all the advantages of the prior art sickle mechanisms and none of the disadvantages.

It is another object of the present invention to provide a new and improved side sickle for a garden tractor which may be easily and efficiently manufactured and marketed.

It is a further object of the present invention to provide a new and improved side sickle for a garden tractor which is of a durable and reliable construction.

An even further object of the present invention is to provide a new and improved side sickle for a garden tractor which is susceptible of a low cost of manufacture with regard to both materials and labor, and which accordingly is then susceptible of low prices of sale to the consuming public, thereby making such side sickle for a garden tractor economically available to the buying public.

Still yet another object of the present invention is to provide a new and improved side sickle for a garden tractor which provides in the apparatuses and methods of the prior art some of the advantages thereof, while simultaneously overcoming some of the disadvantages normally associated therewith.

Still another object of the present invention is to cut weeds with a lawn tractor.

Lastly, it is an object of the present invention to provide a new and improved side sickle for a lawn tractor including a sickle having a first end pivotally coupled with respect to the lawn tractor. The sickle adapted to transfer between a stored orientation and a horizontal orientation wherein the sickle is extended perpendicular with respect to a side of the tractor. The sickle has a plurality of reciprocating blades.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

Similar reference characters refer to similar parts throughout the several views of the drawings.

DESCRIPTION OF THE PREFERRED EMBODIMENT

Figure 1:
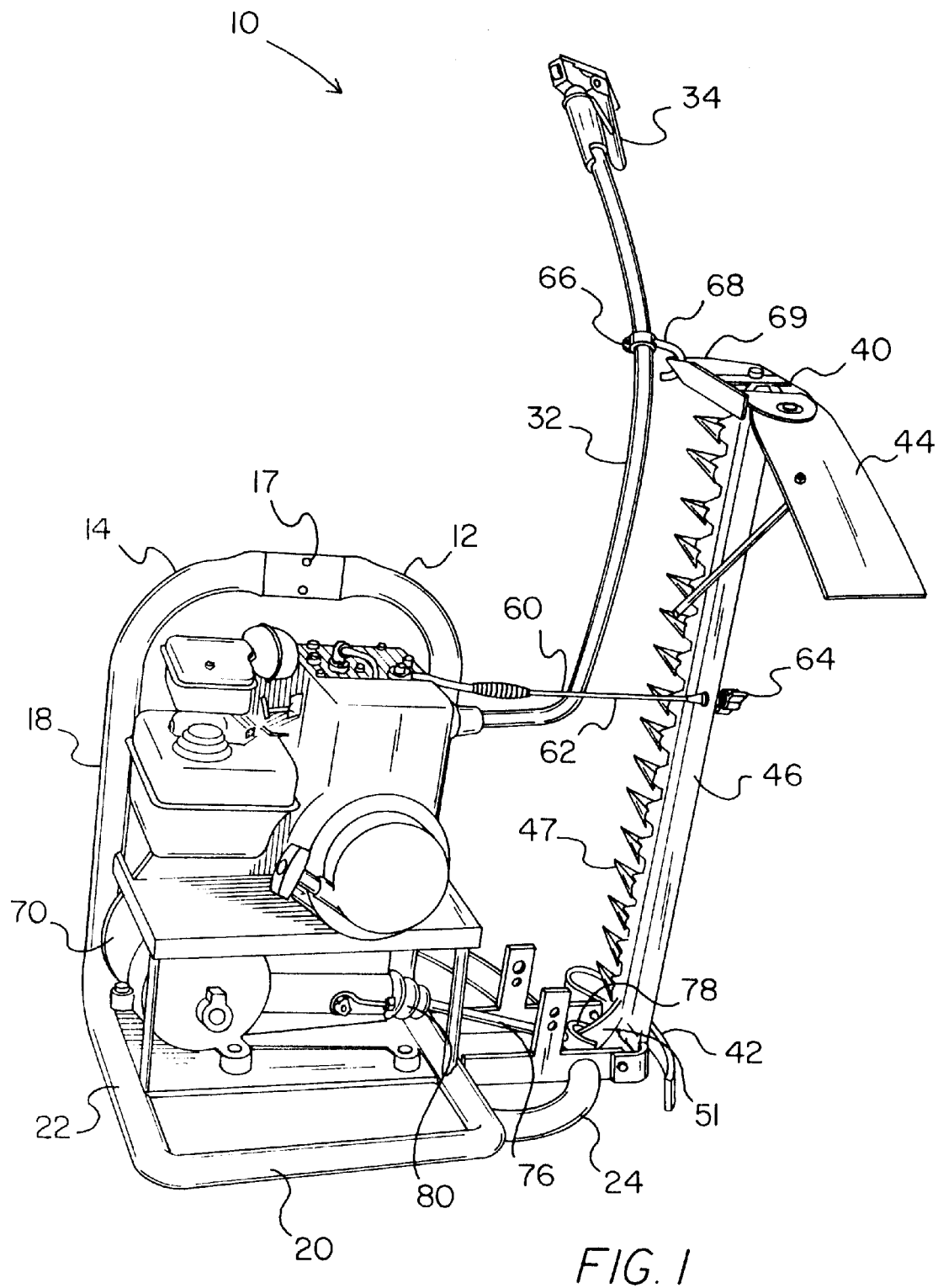
FIG. 1 is a perspective illustration of the preferred embodiment of the side sickle for a garden tractor constructed in accordance with the principles of the present invention.
Figure 2:
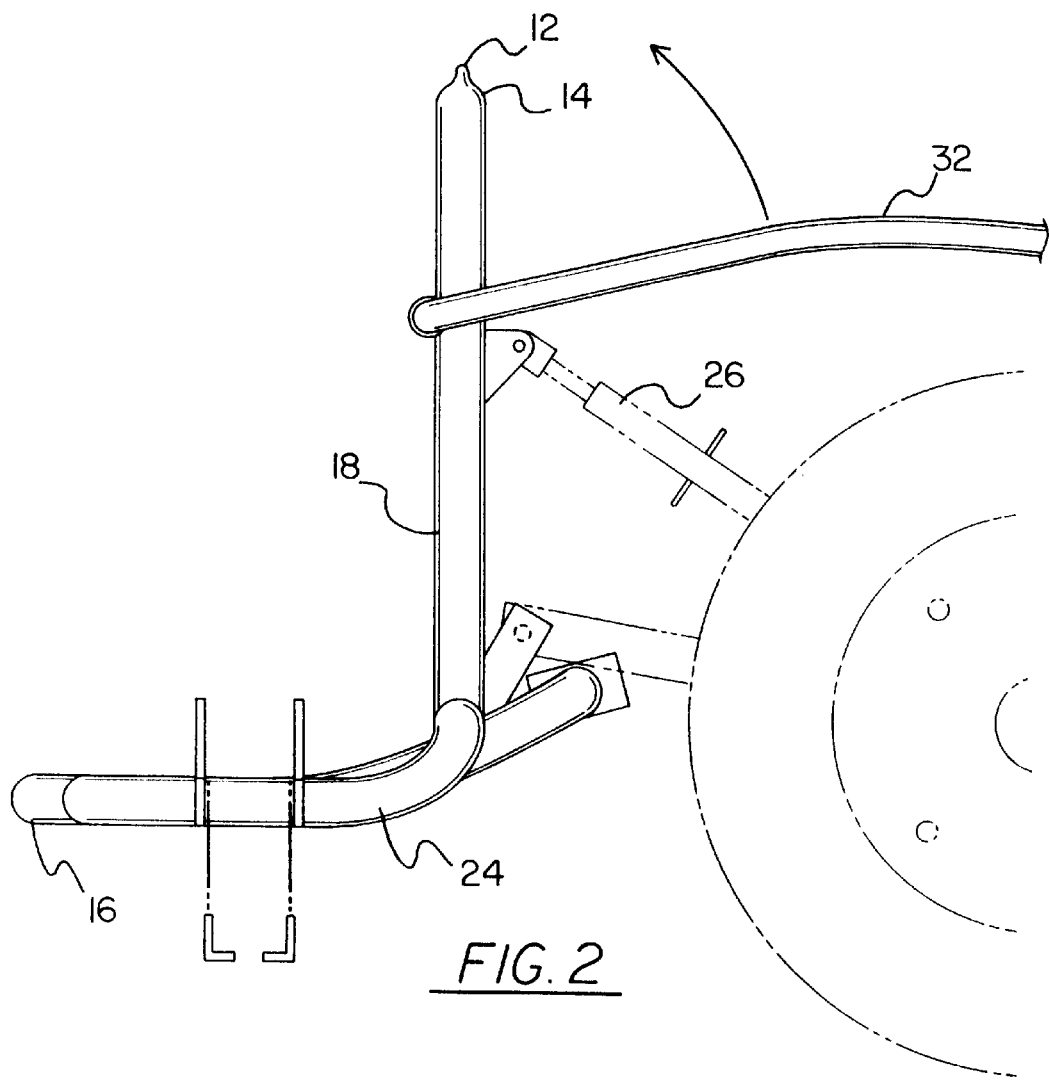
FIG. 2 is a side view of the mounting assembly of the present invention.

With reference now to the drawings, and in particular to FIG. 1 thereof, a new and improved side sickle for a garden tractor embodying the principles and concepts of the present invention and generally designated by the reference numeral 10 will be described.

The present invention, the new and improved side sickle for a garden tractor, is comprised of a plurality of components. Such components in their broadest context include a mounting assembly, engine, sickle, and drive assembly. Such components are individually configured and correlated with respect to each other so as to attain the desired objective.

More specifically, it will be noted that the system 10 of the present invention includes a mounting assembly 12 having an L-shaped configuration with a top vertical extent 14 and bottom horizontal extent 16 each with a U-shaped configuration. The top vertical extent has a top cross bar 17 and a pair of side vertical bars 18 coupled to ends of the top cross bar and extended downwardly therefrom. Note FIG. 1. The bottom horizontal extent includes a rear cross bar 20 and a pair of side horizontal bars 22. Such side horizontal bars of the bottom horizontal extent are coupled between the ends of the rear cross bar and respective bottom ends of the pair of side vertical bars of the top vertical extent of the mounting assembly. As best shown in FIG. 1, the mounting assembly further includes a U-shaped side bar 24 coupled to one of the side horizontal bars of the bottom horizontal extent of the mounting assembly. The side bar 24 resides within the plane in which the side horizontal bars reside. The top extent of the mounting assembly is coupled to a rear lifting mechanism 26 of a convention lawn tractor. Such rear lifting mechanism is convention in nature and controlled by the user from the seat of the lawn tractor. In use, the lifting mechanism is adapted to allow the selective lifting of the mounting assembly.

With reference still to FIG. 1, an engine 30 is coupled atop the bottom extent of the mounting assembly. The engine has an elongated, rigid throttle handle 32 with a first end pivotally coupled to a top side portion of the engine. By this structure, the handle is allowed rotation about a horizontal axis. A second end of the handle is equipped with a depressible lever 34 for activating the motor upon the selective depression thereof. While not shown, the lever is preferably equipped with a shield to protect a user's hand during use. It should be noted that, in the context of the present description, the activation of the engine is meant to refer to the engaging of the clutch. In use, the handle has a first lowered orientation with the lever situated adjacent a seat of the tractor and second raised orientation with the lever positioned distant from the seat in an elevated position. As shown in the Figures, the rod is slightly arcuate in form. While many types of motors may be utilized such as electrical and the like, a combustion engine is utilized in the preferred embodiment of the present invention.

Figure 3:
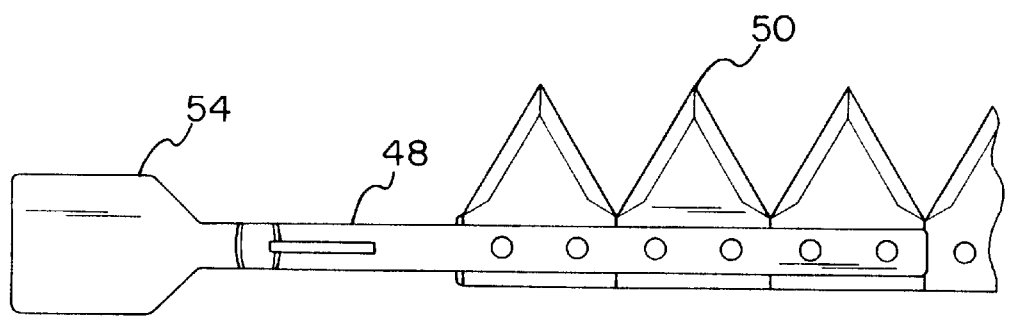
FIG. 3 is a close up view of the blade rod of the sickle of the present invention.

As best shown in FIGS. 1 & 3, an elongated mechanized sickle 40 is provided having a first end pivotally coupled to the U-shaped side bar of the mounting assembly. Ideally, the length of the sickle is 3 feet. The sickle is adapted to only pivot between a horizontal orientation wherein the sickle is extended perpendicular to the side of the tractor and a vertical orientation. The first end of the sickle further has a flexible sled 42 coupled to a lower end thereof. The sickle also includes a generally rectangular, arcuate swath board 44 coupled thereto and extended rearwardly therefrom. As a whole, the sickle is comprised of a sleeve 46 with a plurality of blade guards 47 coupled to a front extent thereof. It should noted from the Figures that the sleeve is the component of the sickle that is pivotally coupled to the mounting assembly. The sickle is also comprised of a blade rod 48. The blade rod is slidably coupled with respect to the sleeve and has a plurality of blades 50 situated between the blade guards. To allow use, the blade rod has an inboard end with a tab 51 coupled thereto. By such design, upon the reciprocating movement of the tab, the blades are adapted to cut foliage. While not shown, a pair of L-shaped constraints are part of the inboard end of the sleeve for engaging a horizontal plate 54 of the blade rod thus ensuring only horizontal motion of the blade rod.

Associated therewith is a sickle locking mechanism 60 including a rod 62. As shown in FIG. 1, the rod has a spring coupled between an inboard and outboard portion thereof. Such rod has a first end coupled to the motor and a second end releasable coupled to a central extent of the sickle. The coupling is preferably afforded by a cap 64 that is threadedly secured to the second end of the rod. As such, the sickle locking mechanism is adapted for selectively maintaining the sickle in the vertical orientation.

Further provided is a throttle locking mechanism 66 including a hook 68 coupled to a central extent of the throttle handle. The hook is designed to be releasably coupled to an eyelet 69 formed in the second end of the sickle.

Figure 4:
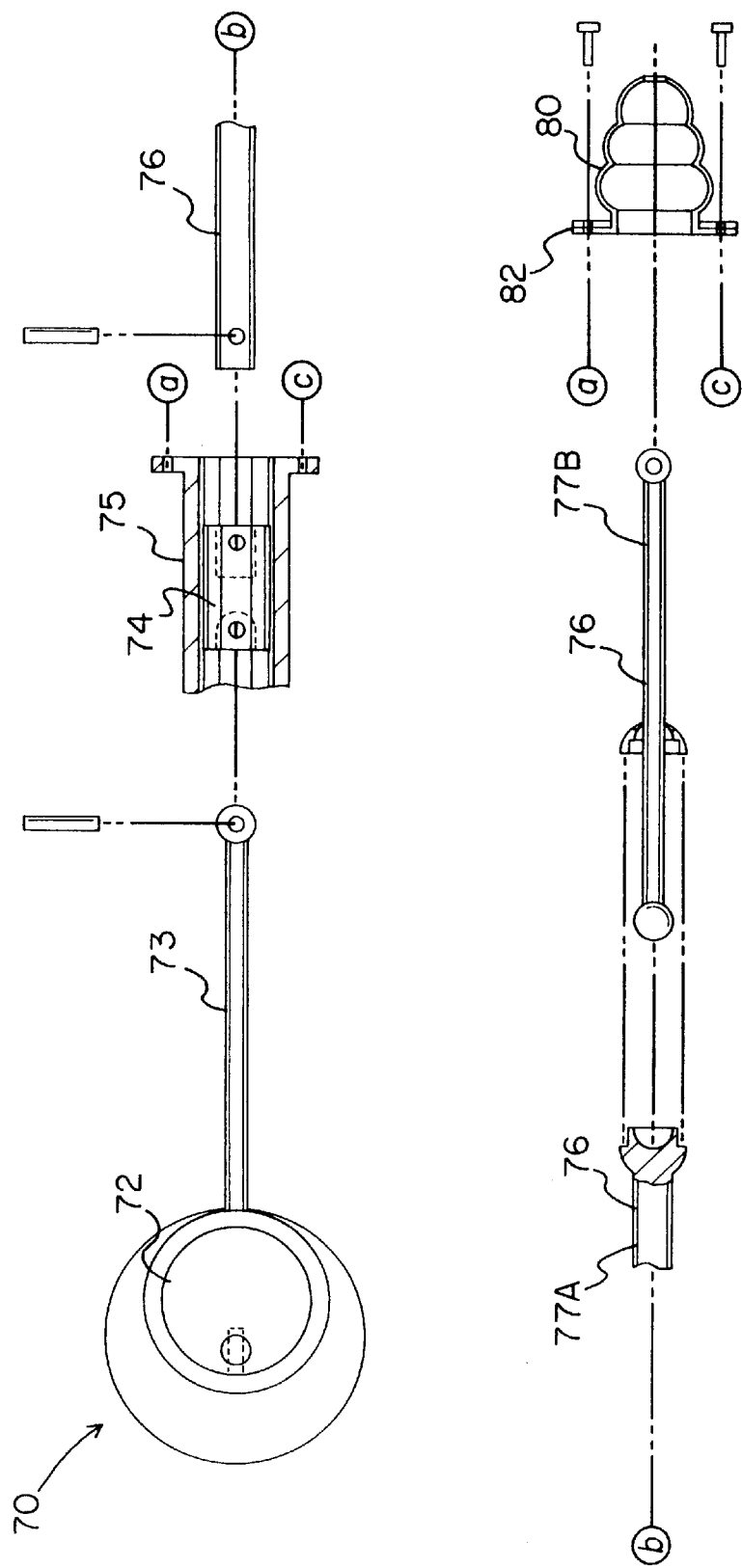
FIG. 4 is an exploded view of the drive assembly of the present invention.

For allowing the engine to effect motion of the blade rod of the sickle, a drive assembly 70 is provided. As shown in FIG. 4, included is a drive wheel 72 eccentrically coupled to the engine via a shaft pin and adapted to rotate upon the activation of the engine. In an alternate embodiment, the drive wheel may be driven by the engine of the tractor. In yet another alternate embodiment, the sickle and engine may be situated on a push cart. In rotatable communication with the drive wheel, or wobble, is a first end of a drive rod 73. The foregoing coupling of the first end is accomplished by way of a ring that is rotatably situated about the wobble. The drive rod also has a second end pivotally coupled to a double pin piston 74. Coupling with the piston is accomplished via pins. It should be noted that the drive rod and the piston are slidably situated within a crank case 75. It should also be noted that all moving parts of the drive assembly are properly lubricated. A connection rod 76 has a first end pivotally coupled to the piston opposite the drive rod. While the drive and connection rod are thin and allowed vertical motion within the crank case, the piston is constrained within crank case and is allowed only to move horizontally. A second end of the connection rod is pivotally coupled to the tab of the blade rod of the sickle by means of a clevis 78. As shown in FIG. 4, the connection rod is composed of two components, an outboard component 77A and a inboard component 77B. Such components are pivotally coupled by way of a ball and socket joint to define the first and second end of the connection rod. Coupled to an end of the crank case and situated about the connection rod is a boot 80. The boot is equipped with a flange 82 for providing a optimal seal with the crank case. An unillustrated spring is concentrically situated within the boot and around the connection rod. Such spring is for stability purposes. Upon the actuation of the engine, reciprocating motion is imparted to the drive and connection rod which, in turn, effects reciprocating movement of the blade rod of the sickle for cutting foliage.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved side sickle for a garden tractor comprising, in combination:

a mounting assembly having an L-shaped configuration with a top vertical extent with a U-shaped configuration, the top vertical extent having a top cross bar and a pair of side vertical bars coupled to ends of the top cross bar and extending downwardly therefrom, the mounting assembly further including a bottom horizontal extent including a rear cross bar with a pair of side horizontal bars coupled between ends of the rear cross bar and bottom ends of the pair of side vertical bars of the top extent, the mounting assembly further including a U-shaped side bar coupled to one of the side horizontal bars of the bottom horizontal extent of the mounting assembly, the top extent of the mounting assembly coupled to a rear lifting mechanism of a convention lawn tractor, the lifting mechanism adapted to allow the selective lifting of the mounting assembly;

an engine coupled atop the bottom extent of the mounting assembly, the engine having an elongated, rigid throttle handle with a first end pivotally coupled to a top side portion of the engine thereby allowing rotation about a horizontal axis and a second end with a depressible lever for activating the motor upon the selective depression thereof, the handle having a first lowered orientation with the lever situated adjacent a seat of the tractor and second raised orientation with the lever positioned distant from the seat in an elevated position;

an elongated mechanized sickle having a first end pivotally coupled to the U-shaped side bar of the mounting assembly, the sickle adapted to only pivot between a horizontal orientation wherein the sickle is extended perpendicular with respect to a side of the tractor and a vertical orientation, the first end further having a flexible sled coupled to a lower end thereof, the sickle further having a generally rectangular, arcuate swath board coupled thereto and extended rearwardly therefrom, the sickle further including a sleeve with a plurality of blade guards coupled to a front extent thereof and a blade rod, the blade rod slidably coupled with respect to the sleeve and having a plurality of blades situated between the blade guards, the blade rod having an inboard end with a tab coupled thereto, whereby upon the reciprocating movement of the tab, the blades are adapted to cut foliage when the sickle is in the horizontal orientation;

a sickle locking mechanism including a rod having a first end coupled to the motor and a second end releasable coupled to a central extent of the sickle for selectively maintaining the sickle in the vertical orientation;

a throttle locking mechanism including a hook coupled to a central extent of the throttle handle, the hook adapted to be releasably coupled to an eyelet formed in the second end of the sickle;

a drive assembly including a drive wheel eccentrically coupled to the engine and adapted to rotate upon the activation of the engine, a drive rod having a first end in rotatable communication with the drive wheel and a second end pivotally coupled to a double pin piston wherein the drive rod and the piston are slidably situated within a crank case, a connection rod having a first end pivotally coupled to the piston and a second end pivotally coupled to the tab of the blade rod of the sickle, and a boot coupled to an end of the crank case and situated about the connection rod, whereby upon the actuation of the engine, reciprocating motion is imparted to the connection rod which, in turn, effects reciprocating movement of the blade rod of the sickle for cutting foliage.

2. A side sickle for a garden tractor comprising:

a lawn tractor;

a sickle having a first end pivotally coupled with respect to the lawn tractor, the sickle adapted to transfer between a horizontal orientation wherein the sickle is extended perpendicular with respect to a side of the tractor and a stored orientation, the sickle having a plurality of reciprocating blades, wherein the sickle is powered by an engine separate from the lawn tractor;

a throttle situated on an end of an elongated bar and in communication with the engine.

3. A side sickle for a garden tractor as set forth in claim 2 wherein the elongated bar is pivotally coupled with respect to the tractor.

4. A side sickle for a garden tractor as set forth in claim 2 and further including a drive assembly including a drive wheel eccentrically coupled to the engine and adapted to rotate upon the activation of the engine, a drive rod having a first end in rotatable communication with the drive wheel and a second end pivotally coupled to a double pin piston wherein the drive rod and the piston are slidably situated within a crank case, a connection rod having a first end pivotally coupled to the piston and a second end pivotally coupled to the sickle, and a boot coupled to an end of the crank case and situated about the connection rod, whereby upon the actuation of the engine, reciprocating motion is imparted to the sickle for cutting foliage.

5. A side sickle for a garden tractor as set forth in claim 2 wherein the sickle is adapted to be selectively elevated.

* * * * *